United States Patent
Burke et al.

(10) Patent No.: US 6,325,705 B2
(45) Date of Patent: Dec. 4, 2001

(54) CHEMICAL-MECHANICAL POLISHING SLURRY THAT REDUCES WAFER DEFECTS AND POLISHING SYSTEM

(75) Inventors: Peter A. Burke; Peter J. Beckage, both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/750,593

(22) Filed: Dec. 28, 2000

Related U.S. Application Data

(62) Division of application No. 09/280,391, filed on Mar. 29, 1999, now Pat. No. 6,168,640, which is a division of application No. 08/911,744, filed on Aug. 15, 1997, now Pat. No. 5,934,978.

(51) Int. Cl.[7] .............................. C09K 3/14; B24B 1/00
(52) U.S. Cl. ............................ 451/288; 51/309; 106/3; 451/290
(58) Field of Search ..................... 51/308, 309; 106/3; 216/88, 89; 438/692, 693; 451/36.41, 288, 290, 285

(56) References Cited

U.S. PATENT DOCUMENTS

| | | |
|---|---|---|
| 4,022,625 | 5/1977 | Shelton . |
| 4,565,637 | 1/1986 | Pearce . |
| 4,851,113 | 7/1989 | Evans . |
| 5,110,463 | 5/1992 | Yuichi et al. . |
| 5,209,816 | 5/1993 | Yu et al. . |
| 5,221,336 | 6/1993 | Horton . |
| 5,318,927 | 6/1994 | Sandhu et al. . |
| 5,354,490 | 10/1994 | Yu et al. . |
| 5,432,046 | 7/1995 | Wanat et al. . |
| 5,478,435 | 12/1995 | Murphy et al. . |
| 5,664,990 | 9/1997 | Adams et al. .......... 451/60 |
| 5,755,614 | 5/1998 | Adams et al. .......... 451/60 |
| 5,800,577 | 9/1998 | Kido ...................... 51/307 |

OTHER PUBLICATIONS

U.S. Patent Application No. 08/342326, filed Nov. 18, 1994, entitled Method of Making a Chemical–Mechanical Polishing Slurry and the Polishing Slurry by Woo et al. (copy not enclosed).

*Primary Examiner*—Timothy V. Eley
(74) *Attorney, Agent, or Firm*—Skjerven Morrill Macpherson LLP

(57) ABSTRACT

A chemical-mechanical polishing slurry made by mixing a ferric salt oxidizer with a solution to produce a mixture with a dissolved ferric salt oxidizer, filtering the mixture to remove most preexisting particles therein that exceed a selected particle size, adding a suspension agent to the mixture, and adding abrasive particles to the mixture after filtering the mixture. Advantageously, when polishing occurs, scratching by the preexisting particles is dramatically reduced.

13 Claims, 8 Drawing Sheets

CHEMICAL-MECHANICAL POLISHING SLURRY THAT REDUCES WAFER DEFECTS AND POLISHING SYSTEM

This application is a division of U.S. patent application Ser. No. 09/280,391, now U.S. Pat. No. 6,168,640, filed on Mar. 29, 1999, entitled Method of Making A Chemical-Mechanical Polishing Slurry That Reduces Wafer Defects, which is a Divisional of U.S. patent application Ser. No. 08/911,744, filed Aug. 15, 1997, now U.S. Pat. No. 5,934,978, all of which are hereby incorporated by reference in their entireties.

BACKGROUND OF THE INVENTION

1. Field of the Invention

The present invention relates to polishing slurry, and more particularly to a chemical-mechanical polishing slurry that reduces wafer defects and its method of making.

2. Description of Related Art

In the manufacture of integrated circuits, the planarization of semiconductor wafers is becoming increasingly important as the number of layers used to form integrated circuits increases. For instance, metallization layers formed to provide interconnects between various devices may result in nonuniform surfaces. The surface nonuniformities may interfere with the optical resolution of subsequent lithographic steps, leading to difficulty with printing high resolution patterns. The surface nonuniformities may also interfere with step coverage of subsequently deposited metal layers and possibly cause open or shorted circuits.

Various techniques have been developed to planarize the top surface of a semiconductor wafer. One such approach involves polishing the wafer using a polishing slurry that includes abrasive particles mixed in a suspension agent. With this approach, the wafer is mounted in a wafer holder, a polishing pad has its polishing surface coated with the slurry, the pad and the wafer are rotated such that the wafer provides a planetary motion with respect to the pad, the polishing surface is pressed against an exposed surface of the wafer, and the slurry is used as a hydrodynamic layer between the polishing surface and the wafer. The polishing erodes the wafer surface, and the process continues until the wafer topography is largely flattened.

In chemical-mechanical polishing (CMP), the abrasive particles provide friction while oxidants and/or etchants cause a chemical reaction at the wafer surface. Additives can also be added to enhance the removal rate, uniformity, selectivity, etc., and dilution by deionized water is also practiced.

CMP is becoming a preferred method of planarizing tungsten interconnects, vias and contacts.

Tungsten CMP slurries typically include abrasive particles such as alumina, a ferric salt oxidizer such as ferric nitrate, a suspension agent such as propylene glycol, and deionized water. With proper process parameters, CMP tungsten processing has shown significantly improved process windows and defect levels over standard tungsten dry etching. One significant advantage of CMP tungsten processing is that it has a highly selective polish rate for tungsten as compared to the dielectric. This selectivity allows for over-polishing while still achieving a flat tungsten stud. When overetching occurs using dry etching, the contact or via becomes further recessed, which creates a serious disadvantage since overetching is frequently required to remove defects.

The advantages of CMP, however, can be offset by the creation of significant defects during polishing, such as scratches. The prior art teaches that scratching can be controlled by the proper manufacturing, size control and filtering of the abrasive particles. The prior art also teaches that the proper mixing sequence of the abrasive particles with the suspension agent leads to lower defects.

Unfortunately, for various reasons, prior CMP slurries have not been as effective as needed. In particular, deep or wide scratch defects in the polished surface continue to cause problems. This may arise since conventional slurry filtering tends to remove only those particles that are significantly larger than most of the abrasive particles. Therefore, a need exists for an improved CMP slurry that reduces scratching defects.

SUMMARY OF THE INVENTION

An object of the invention is to provide a CMP slurry which enables planarization of a polished layer and reduces scratching detects. These objects are achieved by filtering a solution with a dissolved oxidizer before adding the abrasive particles to the mixture, thereby removing a substantial amount of preexisting particles in the solution.

In accordance with one aspect of the invention, a method of making a CMP slurry includes mixing a ferric salt oxidizer with a solution to produce a mixture with a dissolved ferric salt oxidizer, filtering the mixture to remove most preexisting particles therein that exceed a selected particle size, adding a suspension agent to the mixture, and adding abrasive particles to the mixture after filtering the mixture. Advantageously, when polishing occurs, scratching by the preexisting particles is dramatically reduced due to the filtering operation.

These and other objects, features and advantages of the invention will be further described and more readily apparent from a review of the detailed description of the preferred embodiments which follow.

BRIEF DESCRIPTION OF THE DRAWINGS

The following detailed description of the preferred embodiments can best be understood when read in conjunction with the following drawings, in which.

DETAILED DESCRIPTION OF THE PREFERRED EMBODIMENTS

Figure 1:
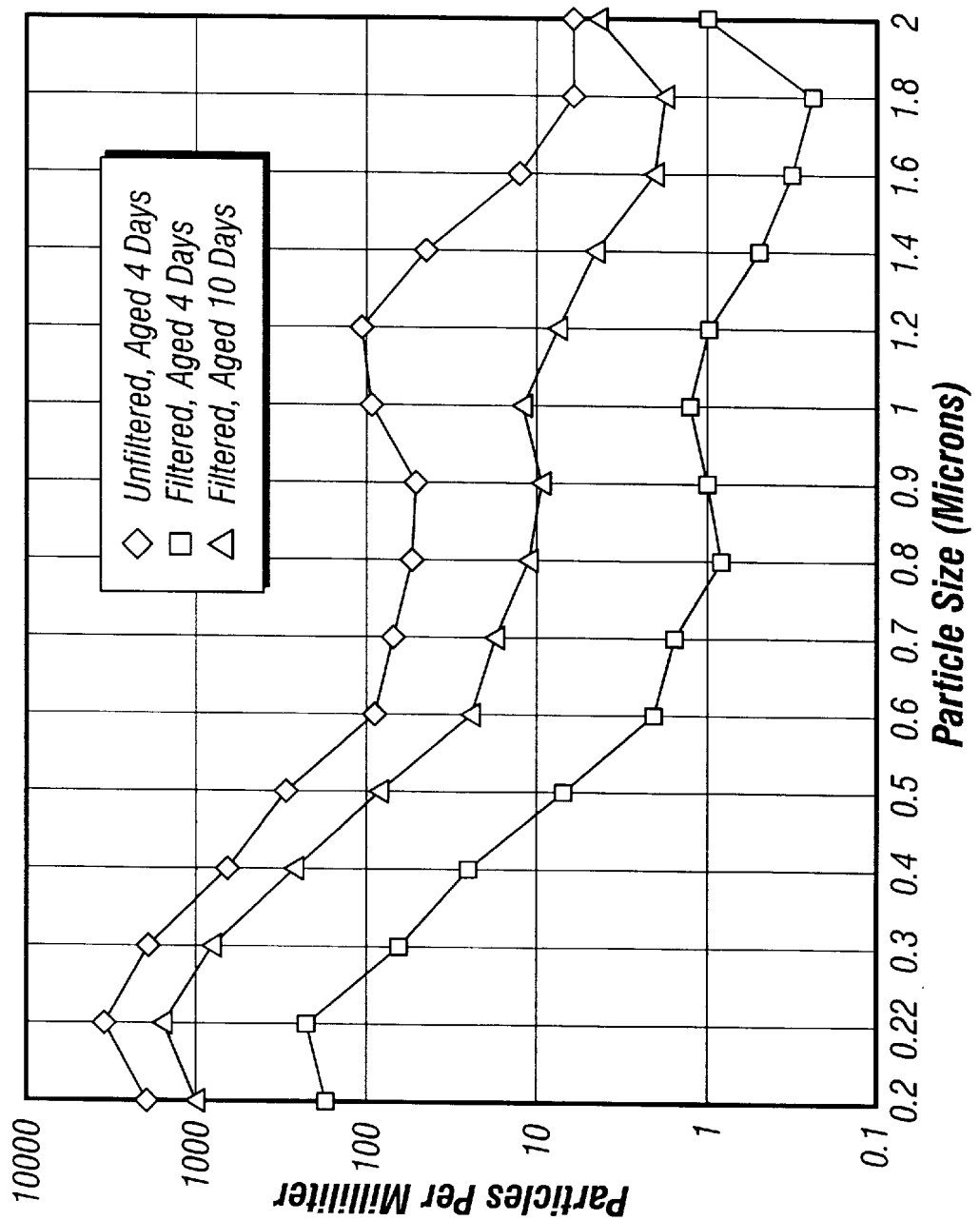
FIG. 1 is a chart of particle size versus particle count for filtered and unfiltered ferric nitrate solutions.

Commercially available CMP equipment and slurries are currently available for planarization of integrated circuits with tungsten vias through silicon dioxide layers. The commercially available slurries, however, exhibit problems such as high scratch counts. Our slurry substantially addresses and reduces these problems.

We have discovered that preexsting particles in slurries can significantly contribute to scratching. As used herein, "preexisting particles" generally refer to unwanted particles that exist in a mixture of an oxidizing agent and a solution before the desired abrasive particles (such as alumina) are added. We believe the preexisting particles include undissolved oxidizing agent, contaminants and/or reaction products formed in the mixture. We specifically believe, for instance, that a contaminant is dust, and a reaction product of a ferric nitrate oxidizer is an organic nitro compound. Moreover, as the slurry ages, the preexisting particles tend to grow and/or coalesce. As a result, when polishing occurs, the preexisting particles can cause substantial wafer damage.

In accordance with one aspect of the invention, a slurry is prepared by mixing a ferric salt oxidizer with a solution to produce a mixture with a dissolved ferric salt oxidizer, filtering the mixture to remove a substantial amount of the preexisting particles therein, adding a suspension agent to the mixture, and adding abrasive particles to the mixture after filtering the mixture.

Preferably, the filtering removes most of the preexisting particles that exceed a particle size of about 0.1 microns, most of the abrasive particles have a particle size in the range of about 0.2 to 0.7 microns, and the slurry is used for polishing within one day of the filtering operation. In this manner, the preexisting particles that remain in the slurry exhibit relatively little growth or coalescence before polishing occurs. Furthermore, as polishing occurs, the preexisting particles cause very little scratching since most of the abrasive particles have a far larger particle size than that of the preexisting particles.

Preferably, the ferric salt oxidizer and the solution are thoroughly mixed before filtering occurs so that essentially all of the ferric salt oxidizer is dissolved. However, if undissolved ferric salt oxidizer remains, the filtering removes most of these particles which exceed a selected particle size.

Preferably, the suspension agent and the abrasive particles are thoroughly pre-mixed so that the suspension agent wets the abrasive particles. It is also preferred that the pre-mixed suspension agent and abrasive particles are added to the mixture immediately after filtering the mixture, especially if polishing occurs several days after the filtering operation, and that the suspension agent inhibits the growth and/or coalescence of the preexisting particles.

Finally, it is preferred that most of the preexisting particles are Fe-containing particles (such as undissolved ferric salt oxidizer), that the preexisting particles have a different composition than the abrasive particles, and that none of the abrasive particles (or particles with the same composition) are in the mixture before filtering the mixture.

Other sequences can be used. For instance, the suspension agent can added to the mixture before filtering the mixture. Likewise, the suspension agent can be added to the mixture after filtering the mixture, and then the abrasive particles can be added to the mixture. It is essential, however, that the abrasive particles be added to mixture after filtering the mixture.

The ferric salt oxidizer can be formulated from suitable Fe compounds, such as ferric nitrate ($Fe(NO_3)_3 \cdot 9H_2O$), ferric chloride hexahydrate ($FeCl_3 \cdot 6H_2O$), ferric sulfate pentahydrate ($Fe_2(SO_4)_3 \cdot 5H_2O$) and ferric ammonium sulfate dodecahydrate ($FeNH_4(SO_4)_2 \cdot 12H_2O$)

The preferred solution in which the ferric salt oxidizer is initially mixed is ultra-pure, deionized water.

The suspension agent (also referred to as a dispersion agent) is preferably an aqueous surfactant that improves the colloidal behavior of the abrasive particles in deionized water, and inhibits the growth and/or coalescence of the preexising particles. For instance, the suspension agent can be a commercially available aqueous mixture of propylene glycol and methyl paraben.

The suspension agent can be formulated from the following classes:

1) glycols such as ethylene glycol, propylene glycol and glycerol;
2) polyethers such as polyethylene glycol;
3) aliphatic polyethers; and
4) akoxylated alkyphenols.

The abrasive particles can be any of the commonly used abrasives such as alumina ($Al_2O$), silicon carbide (SiC), silicon dioxide ($SiO_2$), ceria ($CeO_2$) and silicon nitride ($Si_3N_4$).

The resultant slurry is well-suited for CMP polishing a predominantly tungsten layer during the fabrication of an integrated circuit device. We believe that CMP of tungsten films takes place by a chemical oxidation of the tungsten surface with a suitable ferric salt oxidizing agent in an aqueous solution, followed by mechanical abrasion of the more brittle metal oxide which has formed on the surface by the solid abrasive particles present in the aqueous suspension. Both the oxidation and the abrasion continue simultaneously and continuously. The reaction for tungsten by the ferric ion is

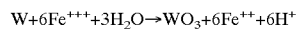
$$W + 6Fe^{+++} + 3H_2O \rightarrow WO_3 + 6Fe^{++} + 6H^+$$

and occurs in an acid solution.

Several CMP experiments (Experiments 1, 2 and 3) as set forth below were performed to determine the affects of filtering a ferric nitrate solution on particle counts and scratches of a subsequently polished wafer. A chemical analysis (Experiment 4) of filtered material from aged ferric nitrate solution was also performed as set forth below.

Experiment 1

In this experiment, the affects of filtering a ferric nitrate solution were investigated. An unfiltered ferric nitrate solution with 0.33M concentration was prepared by adding 500 grams of ferric nitrate crystals to 1 gallon of ultra-pure water (UPW). The solution was agitated slightly by either shaking the bottle or with the aid of a small mixing blade to ensure all the ferric nitrate was dissolved. A filtered ferric nitrate solution was initially prepared the same way as the unfiltered solution, and then filtered through a 0.1 micron filter. A surfactant, which was not mixed with the other solutions, was a commercially available aqueous mixture of propylene glycol and methyl paraben from Universal Photonics, Inc., sold under the trade name "Everflo White".

Particle tests were performed by pouring about 2500 ml of each solution onto a polishing pad while running a particle monitor wafer loaded on a polisher. The order of particle tests was as follows:

1. UPW (to verify the polisher was clean)
2. Surfactant
3. Filtered ferric nitrate solution (tested immediately after filtering)
4. Unfiltered ferric nitrate solution The metrology tool measured defects, which included particles and scratches. The number of defects added in the 0.2 to 0.3 micron range, 0.3 to 0.4 micron range, and above 0.4 micron were measured, and then summed to provide total defects added, as listed below in Table 1. A negative number indicates the removal of particles from the initial count on the particle monitor wafer.

TABLE 1

| Solution | Defects Added 0.2 to 0.3 Micron | Defects Added 0.3 to 0.4 Micron | Defects Added Above 0.4 Micron | Total Defects Added |
|---|---|---|---|---|
| UPW | −2 | −7 | −3 | −12 |
| Surfactant | 12 | 0 | 1 | 13 |
| Filtered Ferric Nitrate | 11 | 0 | 1 | 12 |
| Unfiltered Ferric Nitrate | 1767 | 91 | 171 | 2029 |

Table 1 indicates that filtering the ferric nitrate solution drastically reduced defects on a wafer polished immediately after the filtering operation.

The experimental procedure and equipment for Experiment 1 were as follows:

| | |
|---|---|
| Equipment: | IPEC 472 Avanti Polisher. |
| Wafer Carrier: | Standard design. |
| Polish Pad: | Industry standard. |
| Particle Monitor: | 6000 Å of plasma TEOS (CVD deposited) on prime silicon wafer. |
| Dummy Wafer: | 20,000 Å of plasma TEOS (CVD deposited) on prime silicon wafer. |
| Metrology Tool: | Tencor 6400 Surfscan. |
| Pad Condition: | New pad prior to particle tests. |
| Process Cycle: | Set time of 30 sec per run, 5 psi, 25 rpm carrier, 100 rpm platen. |
| Loading Sequence: | Ran 1 dummy wafer under followed by the particle monitor wafer for each solution tested. |

Experiment 2

In this experiment, the affects of aging unfiltered ferric nitrate solution, filtered ferric nitrate solution, and filtered ferric nitrate solution mixed with a surfactant were investigated. A ferric nitrate solution with a 0.98M concentration was prepared by adding 5 kg of ferric nitrate crystals to 3.33 gallons of UPW. The solution was agitated with the aid of a small mixing blade to ensure all the ferric nitrate was dissolved. The solution was then divided three ways. A first gallon of solution was filtered through a 0.1 micron filter and then mixed immediately with 1 gallon of surfactant (Everflo White), bottled and stored. A second gallon of solution was filtered through a 0.1 micron filter, bottled, and stored. A third gallon of the solution was left unfiltered and stored in a bottle.

The solutions were particle tested after aging for 14 days. The particle tests were performed in a similar manner as the previous experiment. The order the particle tests was as follows:

1. UPW (to verify the polisher was clean)
2. Surfactant and filtered ferric nitrate solution
3. Filtered ferric nitrate solution
4. Unfiltered ferric nitrate solution The results of the particle tests are listed below in Table 2.

TABLE 2

| Solution | Defects Added 0.2 to 0.3 Micron | Defects Added 0.3 to 0.4 Micron | Defects Added Above 0.4 Micron | Total Defects Added |
|---|---|---|---|---|
| UPW | 17 | 2 | −8 | 11 |
| Surfactant and Filtered Ferric Nitrate | 120 | 3 | 14 | 137 |
| Filtered Ferric Nitrate | 281 | 5 | −4 | 282 |
| Unfiltered Ferric Nitrate | 4810 | 509 | 922 | 6241 |

Table 2 indicates that aging the ferric nitrate solutions led to far more defects. In addition, the shelf life was improved by filtering the ferric nitrate, and further improved by mixing the filtered ferric nitrate solution with the surfactant immediately after the filtering operation.

The experimental procedure and equipment for Experiment 2 were as follows:

| | |
|---|---|
| Equipment: | IPEC 472 Avanti Polisher |
| Wafer Carrier: | Standard design. |
| Polish Pad: | Industry standard. |
| Particle Monitor: | 6000 Å of plasma TEOS (CVD deposited) on prime silicon wafer. |
| Dummy Wafer: | 20,000 Å of plasma TEOS (CVD deposited) on prime silicon wafer. |
| Metrology Tool: | Tencor 6400 Surfscan. |
| Pad Condition: | New pad prior to particle tests. |
| Process Cycle: | Set time of 30 sec per run, 5 psi, 25 rpm carrier, 100 rpm platen. |
| Loading Sequence: | Ran 1 dummy wafer under followed by the particle monitor wafer for each solution tested. |

Experiment 3

In this experiment, the affects of aging filtered and unfiltered ferric nitrate solutions were investigated by liquid particle counting. The filtered and unfiltered ferric nitrate solutions used in Experiment 2 (without the surfactant) were diluted to a concentration of about 0.002M by adding about 1 part solution to about 500 parts UPW. Liquid particle counting was performed on the diluted filtered and unfiltered ferric nitrate solutions after 4 days of aging, and on the diluted filtered ferric nitrate solution after 10 days of aging.

Figure 2:
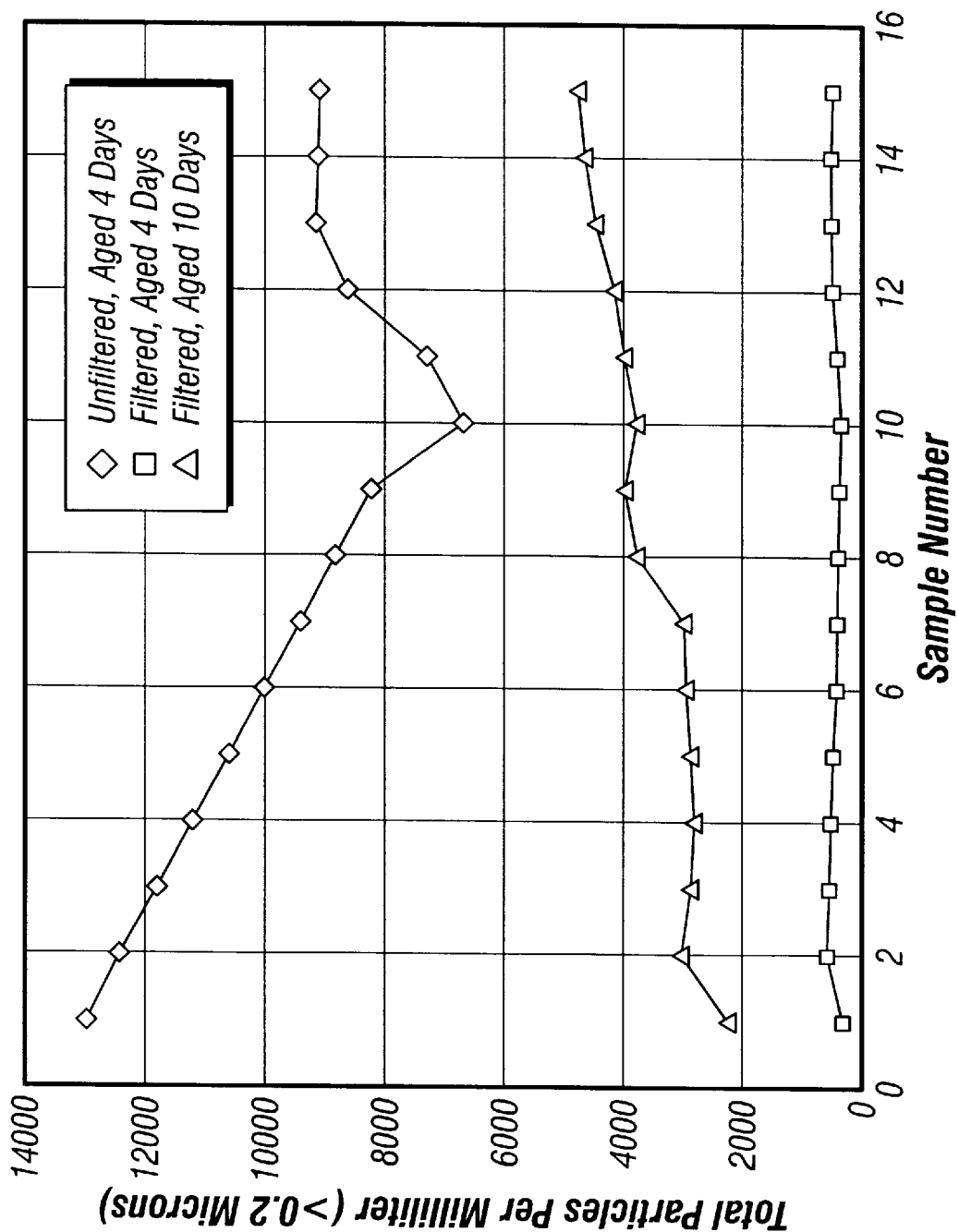
FIG. 2 is a chart of total particles for samples of filtered and unfiltered ferric nitrate solutions.

FIGS. 1 and 2 show the results of the liquid particle counting. FIG. 1 is a chart of particle count versus particle size, and FIG. 2 is a chart of total particles for the samples used. FIGS. 1 and 2 demonstrate that filtering the ferric nitrate leads to dramatic improvements in shelf life as compared to unfiltered ferric nitrate.

The experimental procedure and equipment for Experiment 3 were as follows:

| | |
|---|---|
| Equipment: | CLS-700 liquid particle counter manufactured by Particle Monitoring System and an NEC laptop computer. |
| Purge Gas: | $N_2$. |
| Specimen Container: | Squeeze bottle. |
| Measured Particle Size: | 0.2 to 2.0 microns. |
| Sampling Rate: | Standard. |

Experiment 4

In this experiment, the composition of the preexisting particles in aged ferric nitrate solution was investigated. An unfiltered ferric nitrate solution of 0.6M concentration was prepared by adding 460 grams of ferric nitrate crystals to 0.5 gallons of UPW in a polypropylene bottle. The solution was shaken for about 1 minute, stored for 45 days, and then filtered through a 0.8 micron gold-coated membrane filter. After air drying, the filter was examined by optical and SEM microscopy to identify characteristic particles. Many of the particles were amorphous white particles resembling polymers, while several others were amber flakes. Few smaller particles (i.e., 1–5 micron diameters) were observed.

The amorphous white particles, the amber flakes, and a survey scan of the filter (in an area free from larger particles) were analyzed by EDX spectroscopy to determine elemental composition and by FTIR spectroscopy to identify chemical structure. The results are listed below in Table 3.

TABLE 3

| Particle | Elemental Composition | Chemical Structure |
|---|---|---|
| Amorphous White Particles | Major: C<br>Minor: O, Si, Fe<br>Trace: Al, Cl, Ti | polyethylene and polypropylene and inorganic silicates |
| Amber Flakes | Major: O, Fe, Si<br>Minor: C, Cl<br>Trace: Al, S | polydimethylsiloxane (silicone) and polymer and ferric nitrate and water of hydration and organic nitro compound |
| Survey Scan | Major: Au (filter)<br>Minor: C, O<br>Trace: Al, Si | polydimethylsiloxane (silicone) and polymer and inorganic silicates and trace polyethylene |

Figure 3:
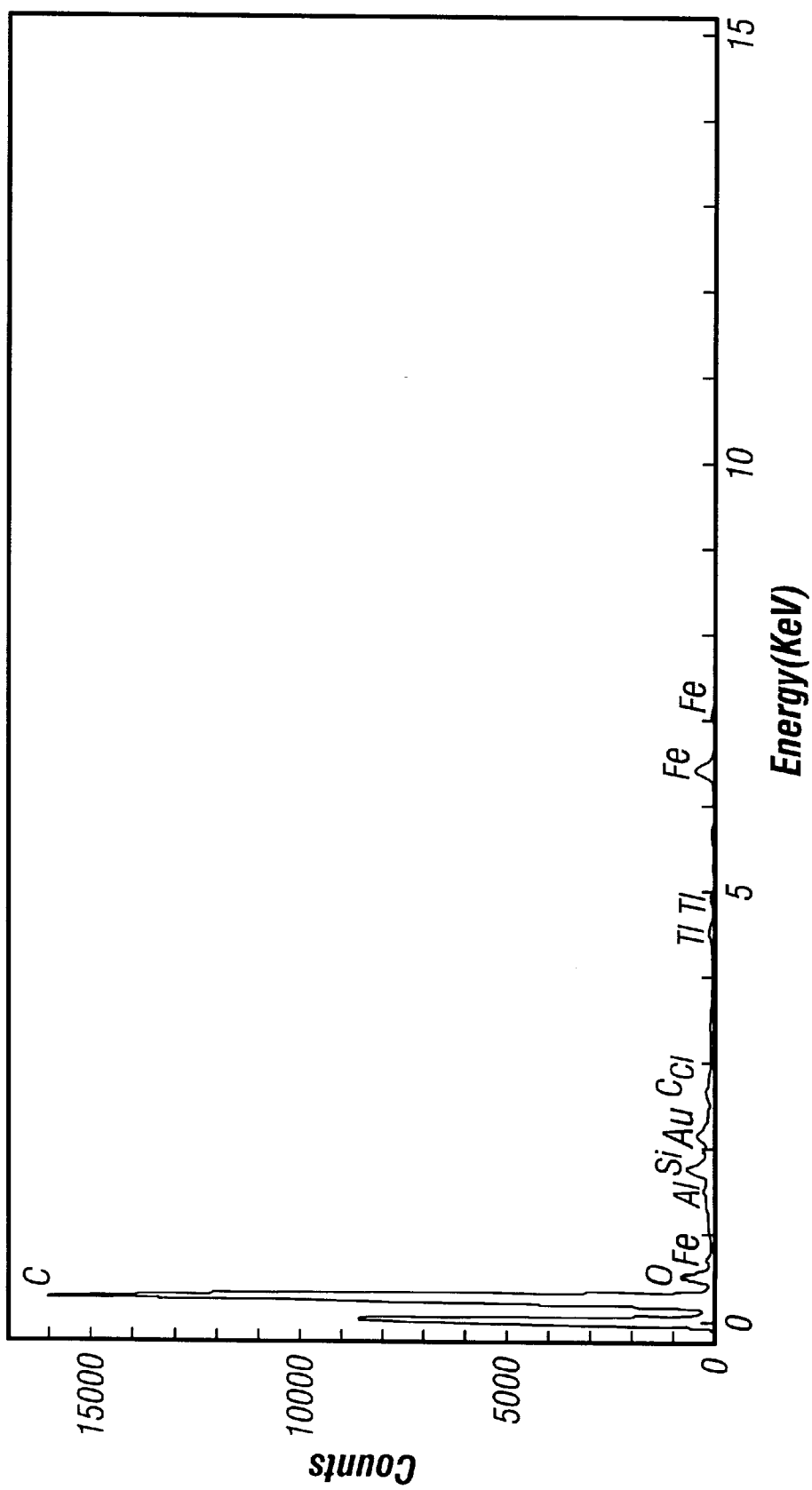
FIG. 3 is an EDX of amorphous white particles filtered from a ferric nitrate solution.
Figure 4:
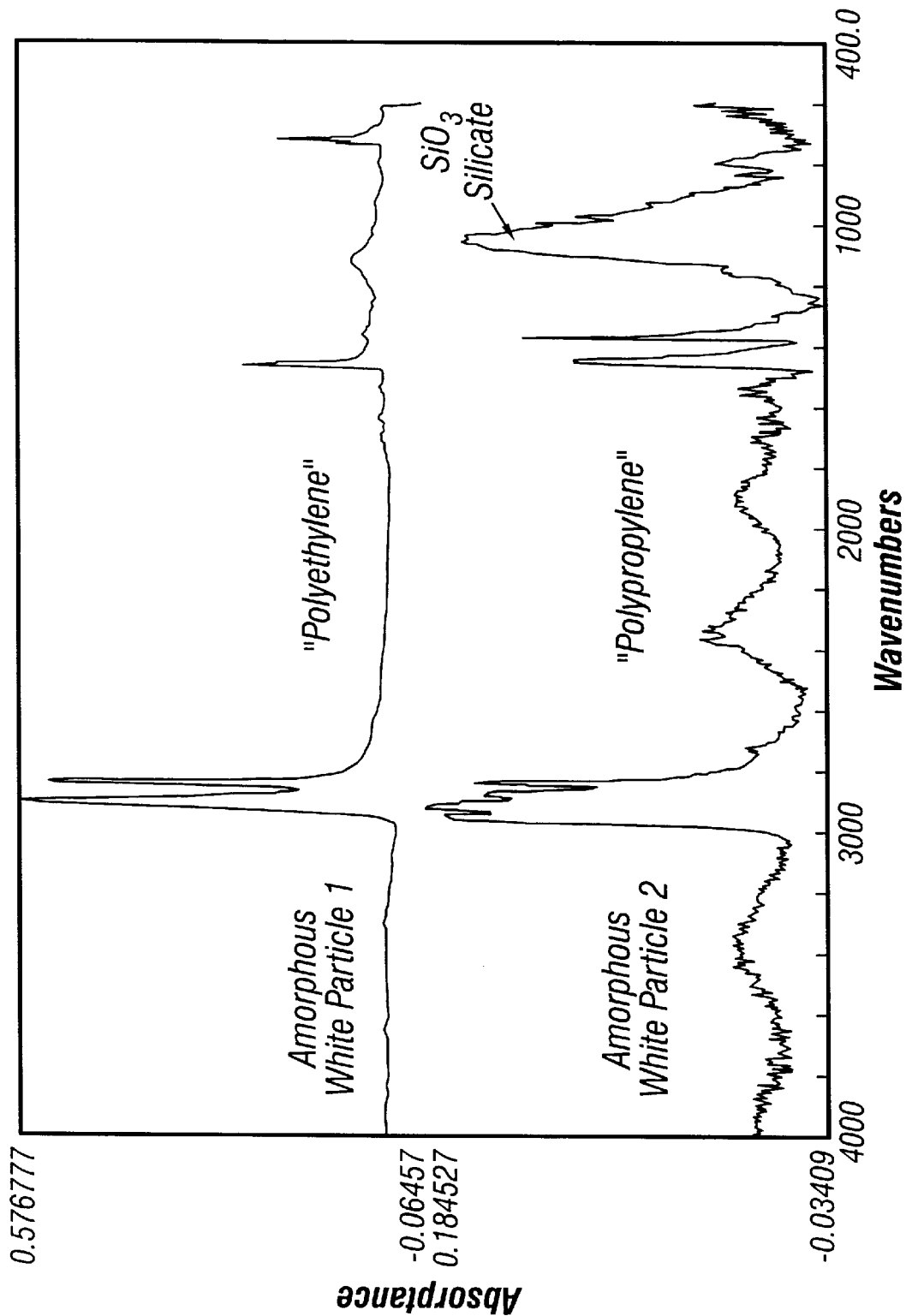
FIG. 4 is an FTIR graph of amorphous white particles filtered from a ferric nitrate solution.
Figure 5:
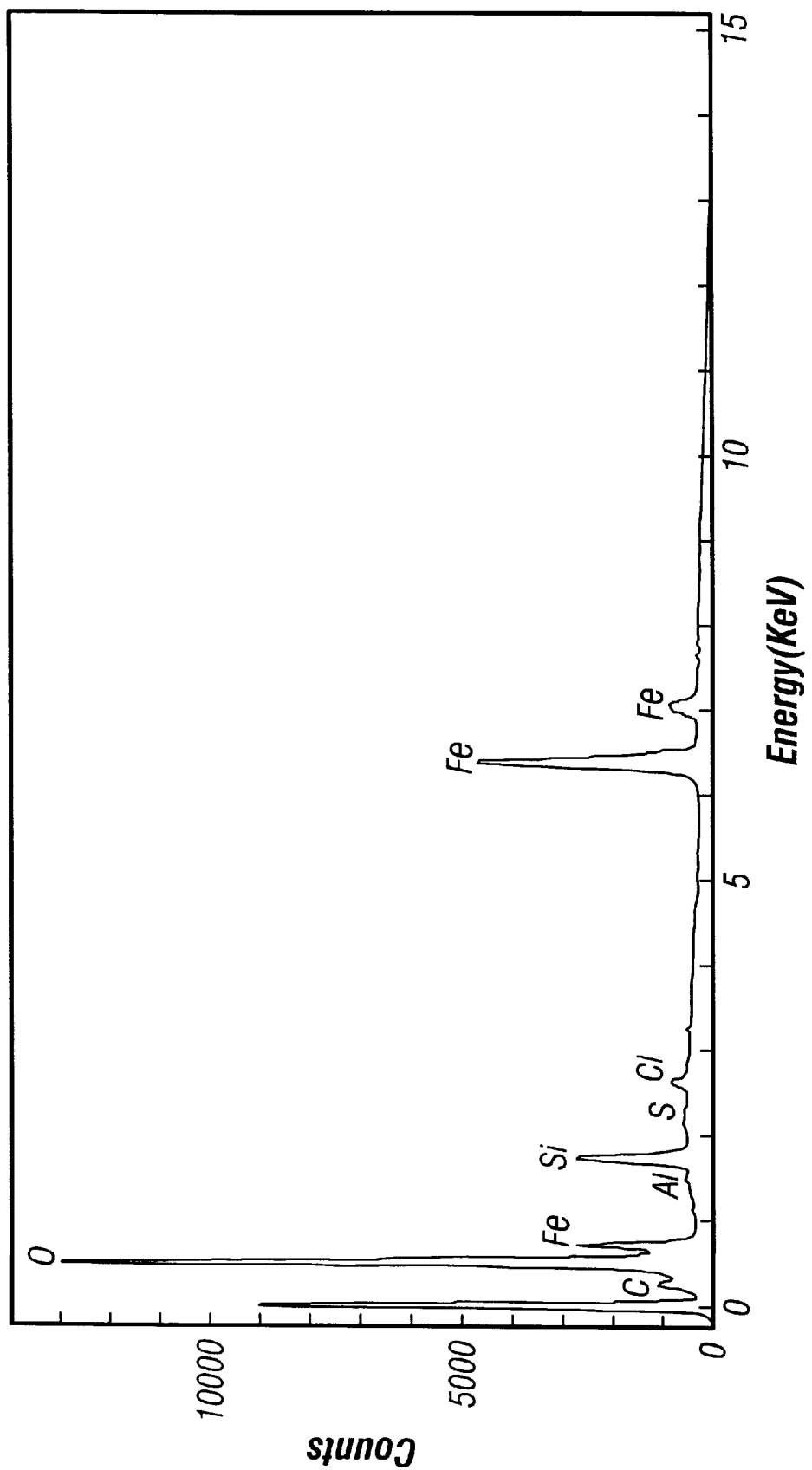
FIG. 5 is an EDX graph of amber flakes filtered from a ferric nitrate solution.
Figure 6:
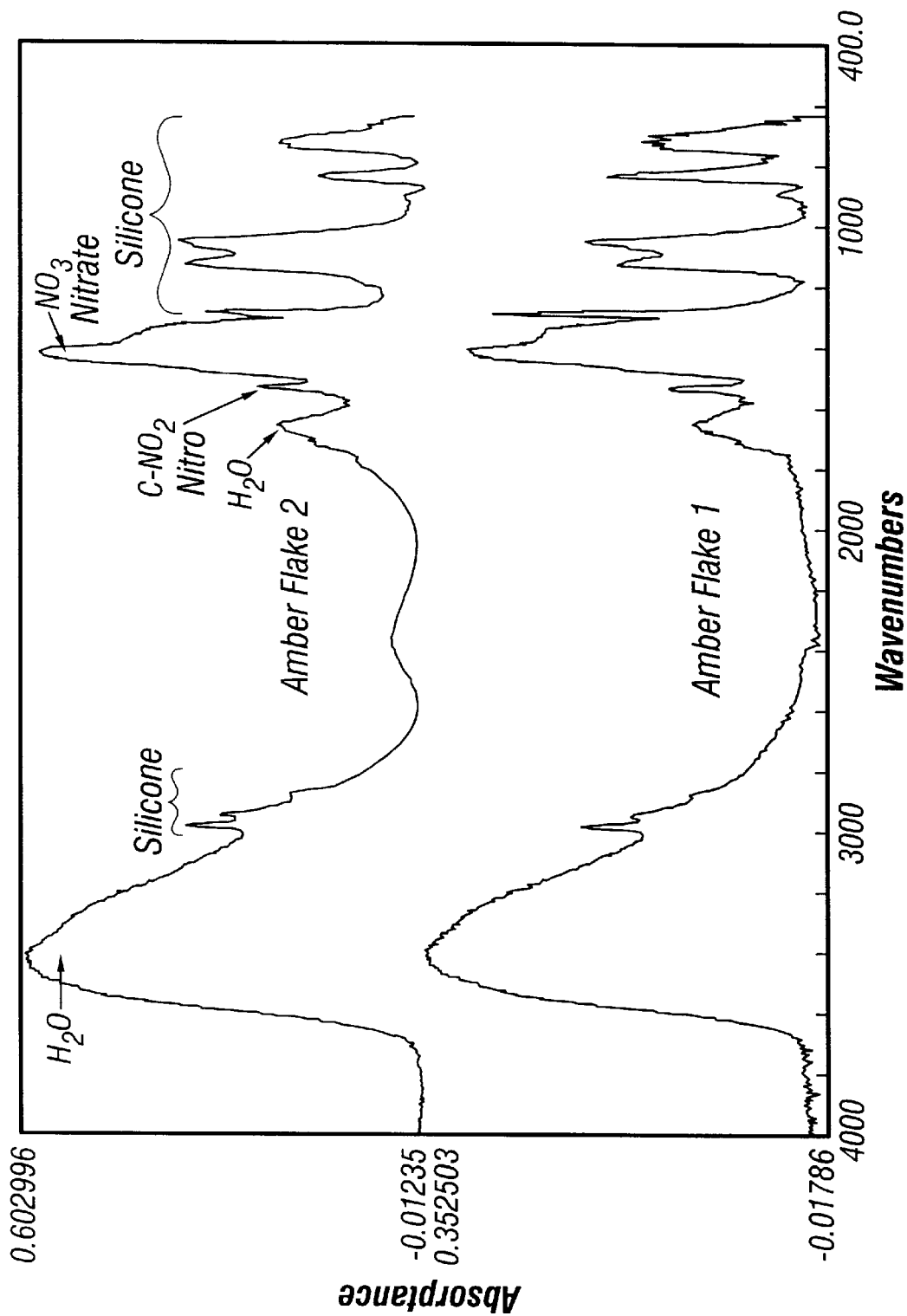
FIG. 6 an FTIR graph of amber flakes filtered from a ferric nitrate solution.
Figure 7:
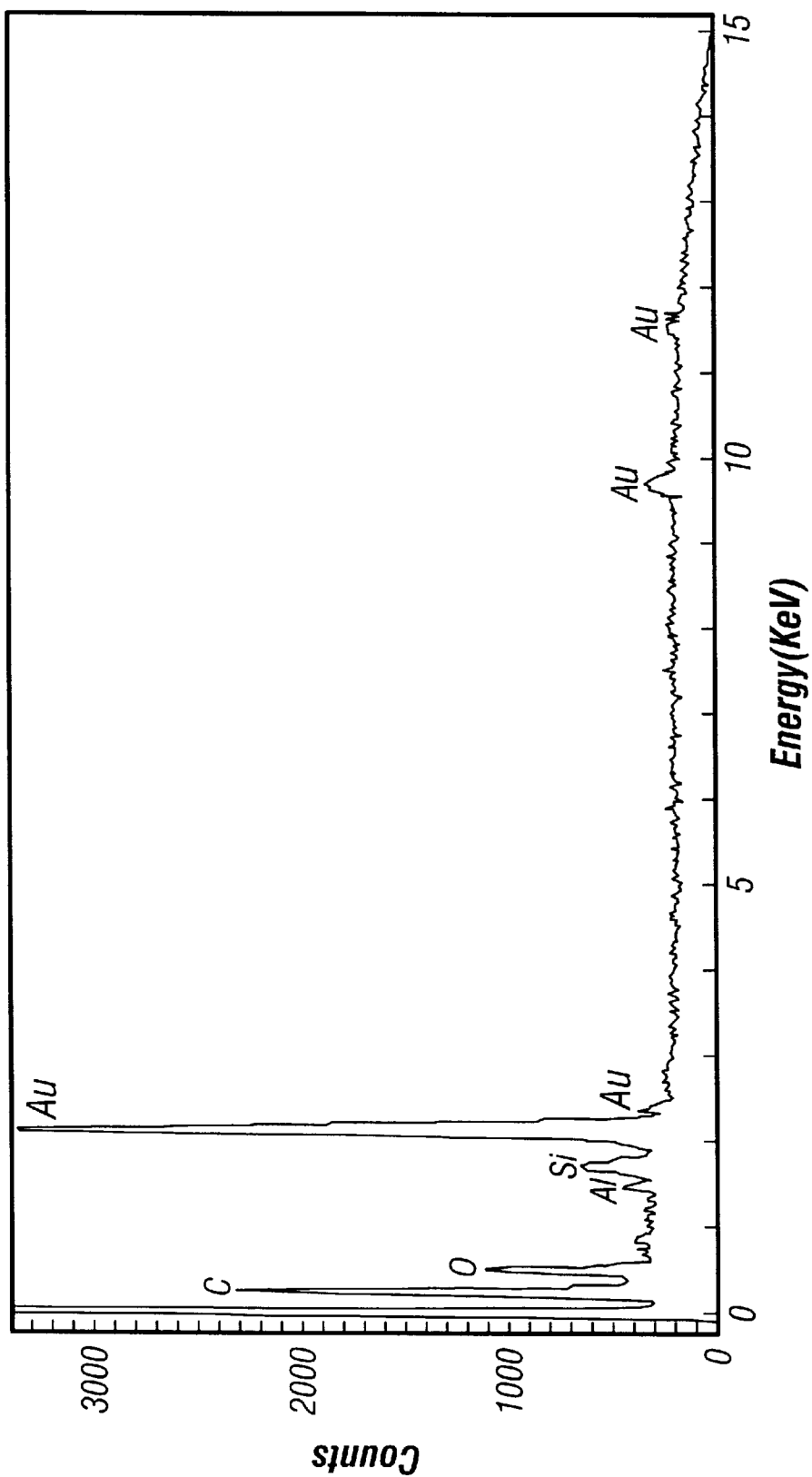
FIG. 7 is an EDX graph of a survey scan of a filter used for a ferric nitrate solution, and FIG. 8 an EDR graph of a survey scan of a filter used for a ferric nitrate solution.
Figure 8:
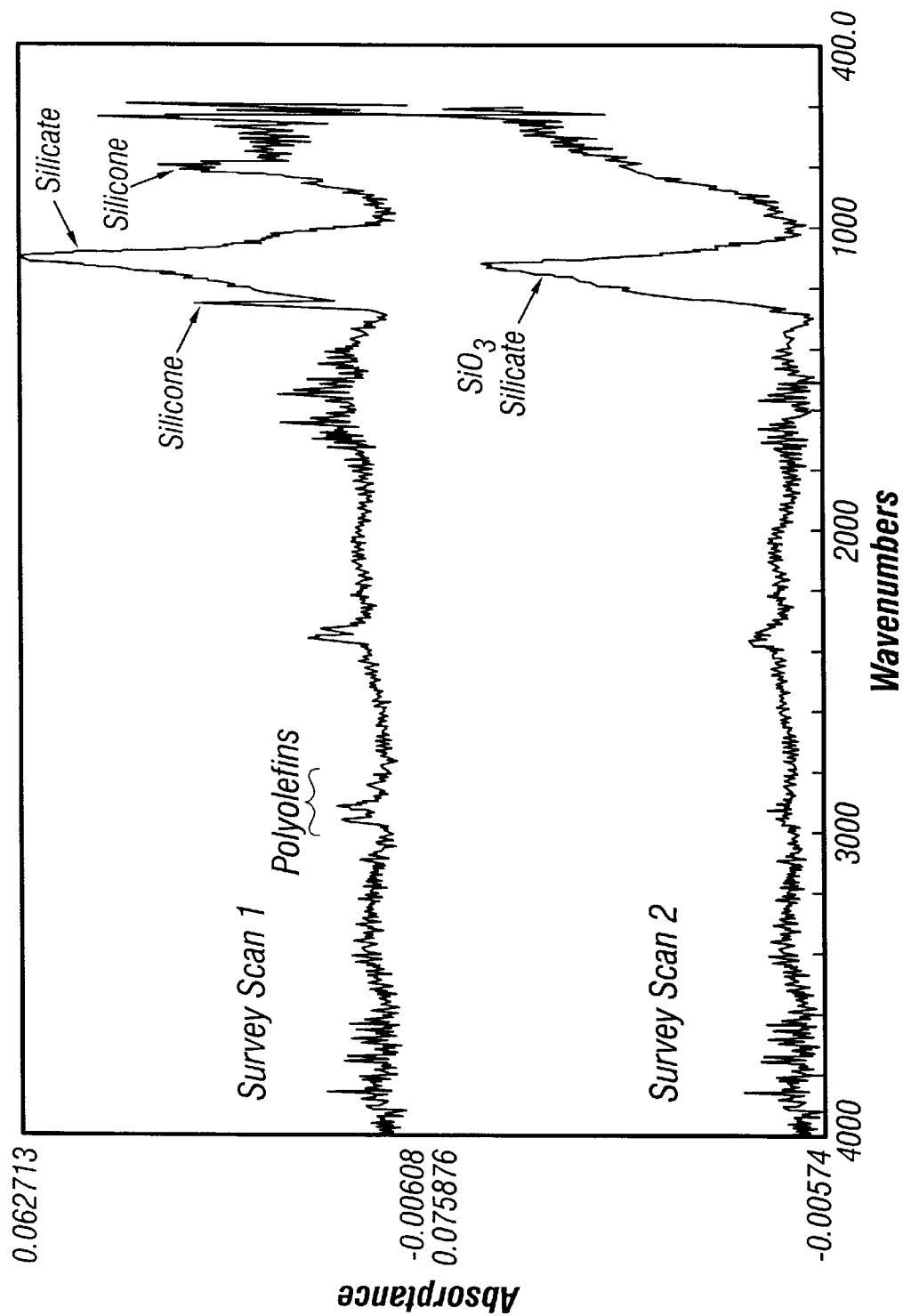

FIG. 3 shows the EDX graph for the amorphous white particles, FIG. 4 shows the FTIR graph for the amorphous white particles, FIG. 5 shows the EDX graph for the amber flakes, FIG. 6 shows the FTIR graph for the amber flakes, FIG. 7 shows the EDX graph for the survey scan, and FIG. 8 shows the FTIR graph for the survey scan.

The EDX and FTIR analysis indicate that most of the filtered particles were polymeric. In the amorphous white particles, the polyolefins (polyethylene and polypropylene) probably came from the polypropylene bottle used to mix and store the solution, and the inorganic silicates probably came from airborne dust but might have been added as fillers to polymer products. Thus, the amorphous white particles appear to be contaminants that can be substantially reduced or eliminated by preparing the solution in a cleaner environment. In the amber flakes, the ferric nitrate appears to be undissolved crystals, the organic nitro compound appears to be a reaction product formed in the solution, and the silicone polymers probably came from sealants, lubricants, defoaming agents, o-rings or gaskets.

FIGS. 1 and 2 demonstrate that the preexisting particles get larger as the solution ages. (That is, the median preexisting particle size increases, although it is entirely possible that many of the preexisting particles do not get larger.) The exact mechanism by which the preexisting particles grow and/or coalesce is not presently understood.

Accordingly, our slurry includes abrasive particles, most of which are larger than a selected particle size, an oxidizer, a suspension agent, and preexisting particles, having been filtered, so that most are smaller than the selected particle size. Although the preferred oxidizer is a ferric salt, other oxidizers such as ammonium persulfate are suitable. The slurry can be used to polish various metals such as tungsten, aluminum and copper.

The slurry is well-suited for use in a polishing system for polishing a semiconductor wafer that includes a polishing pad with a polishing surface, a rotatable platen for removably securing the polishing pad, a rotatable wafer holder for removably securing a wafer such that the wafer can be pressed against the polishing surface, and a dispenser for dispensing the slurry onto the polishing surface. A method of polishing a semiconductor wafer with the slurry includes providing a polishing pad with a polishing surface, mounting a semiconductor wafer on a wafer holder, rotating the polishing surface, introducing the slurry onto the polishing surface, and planarizing the wafer using the rotating polishing surface and the slurry.

Other variations and modifications of the embodiments disclosed herein may be made based on the description set forth herein, without departing from the scope and spirit of the invention as set forth in the following claims.

What is claimed is:

1. A chemical-mechanical polishing slurry, comprising:

abrasive particles, most of which are larger than a selected particle size;

an oxidizer;

a suspension agent; and slurry particles, having been filtered, so that most of the slurry particles are smaller than the selected particle size.

2. The slurry of claim 1, wherein the selected particle size is at most about 0.1 microns.

3. The slurry of claim 1, wherein the abrasive particles are selected from the group consisting of $Al_2O_3$, SiC, $SiO_2$, $CeO_2$ and $Si_3N_4$.

4. The slurry of claim 1, wherein the oxidizer is a ferric salt oxidizer selected from the group consisting of $Fe(NO_3)_3 \cdot 9H_2O$, $FeCl_3 \cdot 6H_2O$, $Fe_2(SO_4)_3 \cdot 5H_2O$ and $FeNH_4(SO_4)_2 \cdot 12H_2O$.

5. The slurry of claim 1, wherein the suspension agent is an aqueous surfactant.

6. The slurry of claim 1, wherein the oxidizer is mixed with a solution to produce a mixture with a dissolved oxidizer, the mixture being filtered to remove a substantial amount of the mixture particles, the suspension agent being added to the mixture, and wherein the abrasive particles are added to the mixture after filtering.

7. A polishing system for polishing a semiconductor wafer, comprising:

a polishing pad with a polishing surface;

a rotatable platen for removably securing the polishing pad;

a rotatable wafer holder for removably securing a wafer such that the wafer can be pressed against the polishing surface;

a chemical-mechanical polishing slurry, including:

abrasive particles, most of which are larger than a selected particle size;

a oxidizer;

a suspension agent; and slurry particles, having been filtered, so that most of the slurry particles are smaller than the selected particle size; and a dispenser for dispensing the slurry onto the polishing surface.

8. The polishing system of claim 7, wherein the selected particle size is about 0.1 microns.

9. The polishing system of claim 7, wherein the abrasive particles are selected from the group consisting of $Al_2O_3$, SiC, $SiO_2$, $CeO_2$, and $Si_3N_4$.

10. The polishing system of claim 7, wherein the oxidizer is a ferric salt oxidizer selected from the group consisting of $Fe(NO_3)_3 \cdot 9H_2O$, $FeCl_3 \cdot 6H_2O$, $Fe_2(SO_4)_3 \cdot 5H_2O$, and $FeNH_4(SO_4)_2 \cdot 12H_2O$.

11. The polishing system of claim 7, wherein the suspension agent is an aqueous surfactant, wherein the surfactant inhibit growth of the slurry particles.

12. The polishing system of claim 7, wherein the slurry particles include reaction product particles formed in the slurry.

13. The polishing system of claim 7, wherein the oxidizer is mixed with a solution to produce a mixture with a dissolved oxidizer, the mixture being filtered to remove a substantial amount of the mixture particles, the suspension agent being added to the mixture, and wherein the abrasive particles are added to the mixture after filtering.

* * * * *